Nov. 5, 1963  F. W. BAUMANN  3,109,978
BRUSHLESS EXCITER
Filed Feb. 2, 1962

STATIONARY PARTS

ROTATING PARTS

INVENTOR.
FREDERICK W. BAUMANN
BY
*James R. Campbell*
ATTORNEY

United States Patent Office 3,109,978
Patented Nov. 5, 1963

3,109,978
BRUSHLESS EXCITER
Frederick W. Baumann, Scotia, N.Y., assignor to General Electric Company, a corporation of New York
Filed Feb. 2, 1962, Ser. No. 170,548
5 Claims. (Cl. 322—87)

The invention described herein relates to dynamoelectric machines and particularly to an exciter useful in supplying excitation power to the field winding in a generator.

In conventional designs of D.C. exciters which include a commutator and brushes, the cross field armature reaction is compensated by flux produced by current flowing through a winding located in the face of the iron pole bodies which support the main field windings. The flux therefore flows in a uniform, well-distributed pattern across the air gap to produce an efficiently operating machine. In the brushless type of exciter however which employs rectifiers in its output winding instead of a commutator and brushes for furnishing unidirectional power to a load, the main field flux cannot be compensated or compounded without the use of slip rings. As a result, the flux crowds to one side of the pole body and in addition to saturating the pole tip, becomes distorted in the air gap and is shifted out of its normal position with respect to the axis of the pole body. Since the advantages of a rotating exciter is the elimination of the commutator and brushes by using shaft mounted rectifiers interconnecting the exciter output and main generator field windings, it is not desirable to add slip rings to this arrangement because it reintroduces mechanical complexities of the type which the rotating rectifier exciter was originally designed to avoid.

It therefore is apparent that the need exists for an improved design of brushless exciter wherein armature reaction can be compensated and main field excitation can be compounded without introducing slip rings or other mechanical devices which otherwise could be used for such compensation or compounding.

In carrying out my invention, I make use of the parasitic field produced by the armature reaction in a brushless exciter by locating a winding on the field poles in inductive relationship with the parasitic field. A voltage is induced in this winding and its output rectified and fed to a compounding winding on the same field poles for providing M.M.F. capable of compensating parasitic armature reaction. An additional advantage gained from this arrangement of windings if the compounding M.M.F. supplements that normally provided by the main field windings when energized.

While the specification concludes with claims particularly pointing out and distinctly claiming the subject matter which I regard as my invention, it is believed the invention will be better understood from the following description taken in connection with the accompanying drawing in which:

Figure 1:
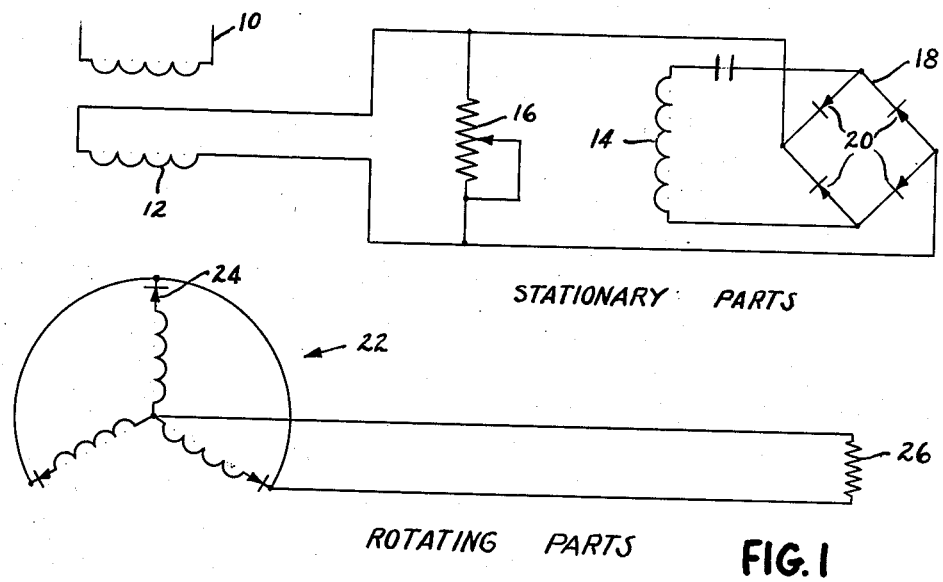
FIGURE 1 is a schematic showing of windings mounted in the stator and rotor cores of an exciter.
Figure 2:
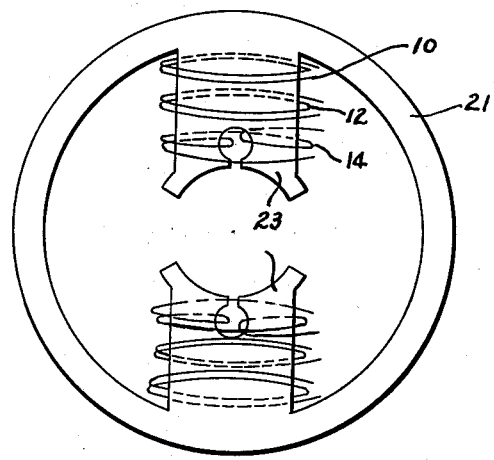
FIGURE 2 illustrates the physical arrangement of the windings in a simple salient pole stator structure.

Referring now to the drawing wherein like reference characters designate like or corresponding parts throughout the several views there is illustrated in FIGURE 1, a winding arrangement for a brushless exciter with the stationary and rotating parts being indicated as shown. The stationary windings are located in slots of a magnetic core and comprise a main field control winding 10 and a compounding field winding 12 magnetically inductive therewith. The quadrature stator winding 14 preferably, although not necessarily, has three times the number of poles of windings 10 and 12. For convenience, FIGURE 2 shows only two poles, the others being omitted to permit showing the location of the windings on the field poles. A variable resistor 16 is connected in parallel with the compounding winding and a full wave rectifier bridge 18 having rectifiers 20 in each leg of the bridge provide unidirectional current to the compounding winding when the exciter is serving a connected load.

FIGURE 2 illustrates how the windings 10, 12 and 14 are disposed in a simple salient pole stator structure. The frame 21 is of the usual design and includes laminated magnetic pole bodies 23 bolted or otherwise secured to the frame in a well known manner. Obviously, the physical design which the frame and magnetic cores may assume can vary over the wide range now available for present exciters. Also, laminated pole bodies of the type shown may be used or the windings may be disposed in a slotted core. The main field compounding and quadrature windings 10, 12 and 14 may be wound in a distributed fashion, in which case, the quadrature winding 14 may be a polyphase winding of 3(P) poles. The main pole span of 120 electrical degrees results in no net flux of three times the number of poles linking the compounding and main windings.

The rotor winding 22 which is adapted for mounting in a rotor in the usual manner is a 3-phase winding inductive to the fundamental poles (P) of the main and compounding windings but with pitch and distribution designed to be inductive to the quadrature winding. Each phase of the winding includes a half-wave rectifier 24 which in the usual construction is mounted on the shaft supporting the rotor. The load 26 served by the exciter may be of any character, such as a synchronous generator field winding 26.

Figure 3:
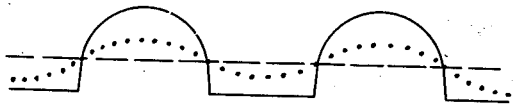
FIGURE 3 shows the output of one of the phases of the rotor winding.

In operation, the curves of FIGURE 3 illustrate the voltage wave forms of the output of one phase of the rotor winding. The solid line indicates the half-wave rectified output. This output is composed of two components, first, a D.C. component illustrated by the dash line, and secondly, an A.C. output component shown by the dotted line. The armature reaction of the A.C. component has the fundamental number of poles P as well as 3(P) poles. The armature reaction due to the direct current produces an M.M.F. of P and 3(P) poles on the rotor which is stationary with respect to the rotor and rotating with respect to the stator at rotational speed. The armature reaction resulting from the A.C. component of current produces an M.M.F. of P and 3(P) poles rotating with respect ot the stator. Since the main field winding and the compounding field winding are non-inductive to 3(P) poles and the quadrature stator winding 14 is inductive to 3(P) poles, an A.C. voltage is induced in the main stator winding 14. The output of the quadrature stator winding is rectified by the full wave bridge of FIGURE 1 and fed to the compounding winding 12 to aid or oppose the main field M.M.F.

When the load is increased by the demand placed on the generator field winding 26, ampere turns will appear in the compounding winding 12 to offset the voltage drop which would normally occur under load, thus aiding compounding. It will be apparent that this winding may be either under or over compounding and thereby act similar to a series field winding in a normal direct current generator. The shunt resistor 16 connected across the compounding winding controls its output. It is desirable to operate the stator winding 14 as near to a short circuited condition as is consistent with the desired output to the compounding winding, since this will reduce the net flux on 3(P) poles and the corresponding reactances of the rotor windings of (P) poles.

If compounding is not desired, a short circuited stator winding will reduce the flux of 3(P) poles and allow a greater output from the exciter. This could be accomplished without resorting to the use of rectifiers in the output of the stator winding in the manner shown in FIGURE 1.

It is possible to make this type of machine self-exciting by using a proper grade of steel in the stator so as to retain the residual flux. This kind of operation is particularly desirable in those installations when the main generator served by the exciter is short circuited. It permits the output from the exciter to maintain short circuit current from the main generator without feedback from the main generator output current. The condition of self-excitation requires a load on the output of the exciter which normally exists when the output of the exciter is connected to the field of a main generator.

In view of the above, it will be apparent that many modifications and variations are possible in light of the above teachings. It therefore is to be understood that within the scope of the appended claims, the invention may be practiced other than as specifically described.

What I claim as new and desire to secure by Letters Patent of the United States is:

1. A brushless exciter comprising a frame enclosing a stator core, main and compounding field windings disposed in said core, a rotor having a winding therein arranged for electrodynamic cooperation with said main and compounding windings for providing useful power to a load, said rotor winding further establishing parasitic fields caused by the output of direct current when supplying power to the load, and a quadrature winding in said stator core positioned in inductive relationship with said parasitic fields, and means connecting said quadrature winding with said compounding winding for providing a compounding M.M.F. for the main field flux.

2. The combination according to claim 1 wherein the output of the quadrature winding is rectified to supply unidirectional current to the compounding winding.

3. The combination according to claim 2 wherein a voltage control element is disposed in the circuit connecting the quadrature and compounding windings.

4. The combination according to claim 3 wherein the voltage control element comprises a shunt connected variable resistor.

5. A brushless exciter comprising a frame enclosing stator and rotor magnetic cores, a polyphase winding in said rotor core, main and compounding field windings and a quadrature winding in said stator core, said stator windings being arranged such that the compounding field winding is magnetically inductive to the main field winding and the quadrature winding is non-inductive to the main and compounding windings, said rotor winding being inductive to all three windings, so that when parasitic fields are established as the result of the armature reaction of the output of D.C. current in the rotor winding an A.C. voltage is induced in the quadrature winding, rectifying means interconnecting the output of the quadrature winding with the compounding winding for providing unidirectional power thereto capable of compounding the main field flux and supplementing the flux established in the magnetic core when the main field winding is energized.

No references cited.